United States Patent [19]
Berenger

[11] Patent Number: 6,013,329
[45] Date of Patent: Jan. 11, 2000

[54] PROCESS AND PLANT FOR MANUFACTURING A COMPOSITE PLASTIC STRUCTURE, FOR EXAMPLE A FLOOR COVERING

[75] Inventor: Daniel Berenger, Saint-Paul-Trois-Châteaux, France

[73] Assignee: Gerflor S.A., Villeurbanne, France

[21] Appl. No.: 08/932,537

[22] Filed: Sep. 17, 1997

[30] Foreign Application Priority Data

Sep. 19, 1996 [FR] France .................................. 96 11627

[51] Int. Cl.⁷ .................................. B05D 3/02; B05D 3/06
[52] U.S. Cl. .................. 427/493; 427/378; 427/389.8; 427/389.9; 427/521; 427/542; 427/557
[58] Field of Search ..................... 427/377, 378, 427/379, 381, 389.8, 389.9, 542, 521, 557, 559, 493

[56] References Cited

U.S. PATENT DOCUMENTS

| | | | |
|---|---|---|---|
| 3,662,737 | 5/1972 | Richards | 126/92 R |
| 3,724,382 | 4/1973 | Zilcosky | 102/65 |
| 3,863,907 | 2/1975 | Pierson, Sr. et al. | 266/34 R |
| 4,288,346 | 9/1981 | Hunter et al. | 427/247 |
| 4,443,185 | 4/1984 | Smith | 432/59 |
| 5,586,877 | 12/1996 | Charmes | 431/115 |

FOREIGN PATENT DOCUMENTS

| | | |
|---|---|---|
| 2 314 837 | 1/1977 | France . |
| 2 678 356 | 12/1992 | France . |
| 1 041 000 | 10/1958 | Germany . |
| 1 325 314 | 8/1973 | United Kingdom . |

*Primary Examiner*—Diana Dudash
*Attorney, Agent, or Firm*—Oliff & Berridge, PLC

[57] ABSTRACT

Process for manufacturing a flat composite plastic structure, for example a floor covering, comprising a textile web and at least one layer of a plastic, for example a polyvinyl chloride, on the reverse side or on the top side, which impregnates the textile web, according to which process:

a) the textile web is made available,
b) a plastisol is made available,
c) the textile web is coated with a layer of plastisol,
d) a radiant surface is obtained by combustion of a combustible gas in contact with a porous structure,
e) the layer of plastisol is heated, using the radiant surface, in order to remove the volatile organic fraction of the coated layer and to cause the plastisol to gel, wherein the combustion of the combustible gas takes place under flameless, catalytic conditions.

8 Claims, 1 Drawing Sheet

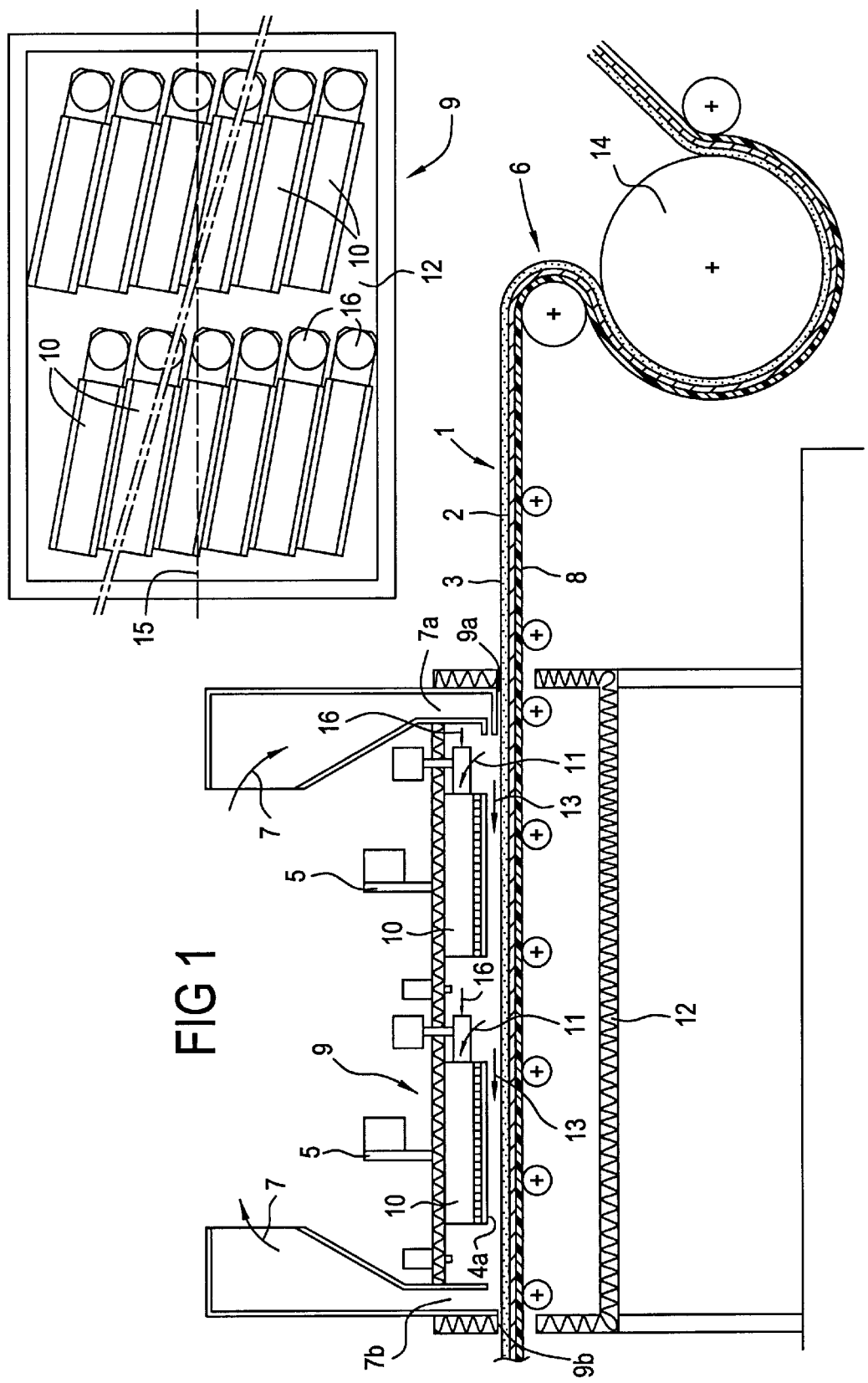

PROCESS AND PLANT FOR MANUFACTURING A COMPOSITE PLASTIC STRUCTURE, FOR EXAMPLE A FLOOR COVERING

BACKGROUND OF THE INVENTION

The present invention relates to the manufacture or production of any composite plastic structure, for example in the form of a sheet or slab, this structure comprising, in general, a strong textile web, giving the plastic structure its cohesion and strength, and at least one layer of a plastic, on the top side and/or reverse side, which impregnates the textile web. The latter comprises one or more yarns, or fibers, for example made of glass, which are organized and assembled with respect to one another in the form of a woven fabric or of a nonwoven. The plastic, which is thermoformable, may be any conventional plastic, such as polyvinyl chloride, chosen and formulated depending on the function of the layer of plastic, and/or on the use of the composite plastic structure.

By way of nonlimiting example, the invention will be introduced, defined, described and explained with reference to the manufacture of a floor covering.

DESCRIPTION OF THE PRIOR ART

It is known to manufacture floor coverings by coating, using any suitable process in which:

a) the strong textile web, for example a fiber-glass nonwoven, is made available, b) a plastisol, i.e. a dispersion of the plastic adopted, for example polyvinyl chloride, dispersed in a liquid medium containing a volatile organic fraction, composed of at least one conventional plasticizing agent, is prepared or made available, c) the textile web is coated with a layer of plastisol, in order to obtain the layer of plastic, in the liquid or pasty state, coating and impregnating at least part of the textile web, d) by combustion of a combustible gas, in contact with a refractory porous structure, i.e. using one or more gas and infrared burners, a radiant or radiating surface is obtained, and e) the layer of plastisol is heated, using the heat emitted by the radiant surface, in order to remove the volatile organic fraction of the coated layer by vaporization and to cause the plastisol to gel.

A plant for doing this is already known, said plant comprising:

- a means for coating the textile web with the layer of plastisol,
- a means for transporting the textile web coated with the layer of plastisol for example a conveyor belt,
- an oven for gelling the plastisol, through which the transporting means pass from an inlet to an outlet, the oven comprising radiant-gas burners, each having a refractory porous structure, which are arranged above the transporting means and inside the oven in order to radiate heat toward the layer of plastisol; and a means for circulating a stream of air is arranged so that the air flows as a co-current over the textile web coated with the layer of plastisol.

With plastisol-gelling ovens having infrared burners, it is found that there is a significant loss of plasticizing agents, these as it were therefore evaporating in the oven, and therefore there is a significant deplasticization of the layer or layers of plastic, and consequently of the composite plastic structure or of the floor covering.

This deplasticization is to the detriment of the required properties, and in particular makes the plastic much less flexible, or even brittle, which is unacceptable for a floor covering.

The object of the present invention is therefore to reduce the deplasticization in a gelling oven by using, in particular, infrared gas burners.

Surprisingly, and as is explained below, it has been discovered that the use of catalytic burners, instead of the usual infrared radiant burners, makes it possible to reduce the deplasticization of the plastic considerably, in particular the deplasticization of a floor covering for example. For a starting formulation comprising 42% (by weight of the unfilled plastic) of plasticizing agents, the loss of the latter is reduced to 3±1%, compared with 7% with any other type of gelling oven, for example one having conventional infrared gas burners.

This improvement has two essential consequences:
  on the one hand, it makes it possible to work with plastic formulations which are relatively more highly filled, and therefore less expensive, and
  on the other hand, it makes it possible to obtain plastic surface finishes which are much glossier, thereby in particular dispensing with any application of one or more surface varnishes.

With regard to the surface finish, the surface gloss, measured conventionally, is improved up to a value of 50%, instead of from 20 to 30% as obtained using a conventional gelling oven.

Also unexpectedly, and during use of the floor covering, the solution according to the invention serves to limit the yellowing of plastic. For example, using a gelling oven according to the invention, the yellowness index measured using the standard methods is 0.2 yellowness index points compared to 0.7 when the same floor covering is obtained using a conventional gelling oven.

This is very favorable since, in particular, it is thus possible to limit the amount of heavy metals (lead, tin, barium) which are added in order to stabilize the plastic formulation.

To conclude, the recourse to catalytic burners makes it possible, all other things being equal, to reduce the length of the gelling oven. In particular, coupled with a preheating oven, a length of from 8 to 15 meters is sufficient for completely gelling the plastisol; this length should be compared with the 40 meters of the usual gelling ovens, which are required for the same result. This reduction in the length of the gelling oven enables the length of the latter to be maintained at a uniform and homogeneous temperature, which in turn makes it possible to ensure that the plastic is very uniform and homogeneous, including when it is molded, both in the machine direction and in the cross direction of the composite plastic structure, or floor covering.

This relatively short length also makes it possible to operate and control the gelling oven much more easily, by limiting the yardage of the plastic between the point of measurement of a set value, for example a thickness, and the point of deposition of the plastisol in the liquid or pasty state. It follows that there is greater uniformity in the quality of the plastic and of the finished composite plastic structure, by limiting the losses of material in the event of malfunction of the gelling oven.

By way of example, in a normal gelling oven deviations of plus or minus 3/10th of a millimeter are frequently obtained, in the cross and machine directions of the floor covering. Using an oven according to the invention, i.e. an oven having catalytic burners, no deviations greater than 1/10th of a millimeter could be measured. When the composite plastic structure has to be cut up, for example into floor-covering tiles, the invention therefore makes it possible to reduce the scrap which results from the variations in thickness in the cross and machine directions of the floor covering.

SUMMARY OF THE INVENTION

Consequently, in terms of the process, the present invention is one wherein the combustion of the combustible gas takes place under flameless, catalytic conditions. Furthermore, in terms of the plant, the present invention is one wherein that the refractory porous structure of each radiant burner of the gelling oven supports a combustion catalyst, by means of which each said burner is a catalytic burner.

The plastics which can be used according to the invention are, for example, polyvinyl chlorides.

Polyvinyl chloride is understood to mean any polymer containing at least 50% by weight of the residue of the polymerization of vinyl chloride and of a vinyl comonomer, for example vinylidene chloride, vinyl acetate, ethylene or propylene. The polyvinyl chlorides in question in the present invention may be in suspension, microsuspension or emulsion, and their K value is between 55 and 85.

Plasticizing agent is understood to mean any material or additive conferring plasticity on the plastic, such as a phthalate, a benzoate, a trimellitate, a diester of an aliphatic acid, a citrate, or else a polymer of the polyester or epoxy type.

Two types of catalytic burner may be used according to the invention, namely either a primary-air catalytic burner, by means of which the combustible gas and the primary air are mixed before combustion in contact with the catalyst, or a secondary-air catalytic burner, by means of which the combustible gas passes through the refractory porous structure without the addition of primary air.

BRIEF DESCRIPTION OF THE DRAWINGS

The present invention is now described with reference to the appended drawing, in which:

FIG. 1 represents diagrammatically a view in longitudinal cross section, of part of a plant for producing a flat composite plastic structure, for example a width of a floor covering, and FIG. 2 represents a view of the plant shown in FIG. 1, from above.

DESCRIPTION OF THE PREFERRED EMBODIMENT

A floor covering 1, i.e. a flat composite plastic structure is manufactured, in the form of a width, using the plant shown in FIGS. 1 and 2, said composite plastic structure comprising a strong textile web 2, in this case a fiberglass nonwoven, and a topside layer 3 of a plastic, in this case a polyvinyl chloride, which impregnates the textile web. In accordance with the representation in FIGS. 1 and 2, the respective thicknesses of the textile web 2 and of the layer 3 of plastic have been intentionally and relatively exaggerated, for the sake of clarity.

The plant shown in FIGS. 1 and 2 comprises:

a means, not shown, for coating the textile web 2 with a layer 6 of a plastisol, i.e. a paste or liquid comprising the plastic dispersed in a liquid medium itself containing a volatile organic fraction composed of at least one plasticizing agent, a means 8 for transporting the textile web 2 coated with the layer 6 of plastisol, for example a means for transporting it flat, such as a system of carrier rollers, ensuring that the textile web 2, coated with the plastisol, is conveyed flat, a drum 14 for preheating the textile web 2 coated with the layer 6 of plastisol, and a thermally insulated oven 9 for gelling the plastisol, through which the means 8 for transporting the web flat pass, from an inlet 9a to an outlet 9b.

The oven 9 comprises radiant and catalytic burners 10. Each burner 10 has a casing which delimits a chamber for distributing the combustible gas, optionally mixed with primary air, and a porous, preferably refractory, structure 4 which supports the combustion catalyst, for example a silica wafer, for example having a honeycomb structure, or else a refractory fabric permeable to the gases. The burners 10 are placed inside the oven 9 in order to radiate heat towards the layer 6 of plastisol, and are arranged above the transporting means 8 so that the radiant surface face 4a of each is oriented at an acute angle with respect to a longitudinal plane 15 of the gelling oven (of FIG. 2).

As shown in FIG. 1, each radiant burner 10 is a primary-air catalytic burner or a secondary-air catalytic burner. In the first case, the combustible gas 5 is mixed in each burner 10 with primary air 11, by means of an auxiliary turbine, before combustion in contact with the catalyst; in this case, the primary air may be taken from outside the gelling oven 9, or from inside the latter, as shown in FIG. 1, by means of which at least a part 16 of the vaporized volatile organic fraction is mixed with the combustible gas and burnt with the latter in the catalytic burner. In the second case, the combustible gas 5 passes through the porous structure 4, without the addition of primary air, and the combustion takes place at the outlet of the structure 4, in contact with the ambient air mixed with the vaporized volatile organic fraction.

Means are provided for causing a stream of air 7 to flow as a co-current over the textile web 2 coated with the layer 6 of plastisol, i.e. in the same direction as the web 2 is traveling. This stream of air 7 is preheated, before it is injected into the oven 9, and is removed with the residual, vaporized volatile organic fraction at a higher temperature than the injection temperature.

As shown in FIGS. 1 and 2, the oven 9 comprises a box 12, substantially isolated from the outside, in which the radiant and catalytic burners 10 are arranged, with an inlet 7a and an outlet 7b for the stream of air 7 flowing as a co-current over the transporting means 8. Means 13 for the forced convection of the air present in the box ensure contact of this air successively with the layer 6 of plastisol, during gelling, and the radiant surface 4a of the radiant burners 10. This makes it possible, in particular, to bring at least part of the vaporized volatile organic fraction into contact with the radiant surface 4a of each burner 10.

By way of example, a gelling oven as described above comprises two rows of thirteen burners, having in total a thermal power of 350 kW. Each burner 4 makes an angle of 17±6° and preferably 17±1° with respect to a longitudinal plane 15 of the oven 9. Respecting this angle makes it possible to ensure that the heating power is distributed uniformly. The stream of air 7 is about 10,000 Nm³/h, the air being heated to 175±20° C.

The process implemented using the plant described above is as follows:

a) a strong textile web 2 is made available
b) the plastisol is made available
c) the textile web 2 is coated with the layer 6 of plastisol, in order to obtain a layer of plastic, in the liquid or pasty state, d) by catalytic combustion of the combustible gas 5 and of at least part of the vaporized volatile organic fraction, the layer 6 of plastisol is heated in order to remove the volatile organic fraction of the coated layer and to cause the plastisol to gel.

In particular, the plastisol is foamed, by chemical or mechanical means, while it is gelling.

During gelling, the preheated stream of air 7 is made to flow as a co-current over the textile web 2 coated with the layer 6 of plastisol.

Various examples are now described, these being based on the formulations detailed in Table 1.

In this table, the compositions are indicated in parts by weight.

TABLE 1

| Impregnation plastisol Composition A | | Decorative foam plastisol Composition B | | Surface plastisol Composition C | | Reverse-side smoothing plastisol Composition D | | Comfort foam plastisol Composition E | | Mechanical foam plastisol Composition F | |
|---|---|---|---|---|---|---|---|---|---|---|---|
| Chlorinated paraffin | 112.7 | DOP | 671.3 | BBP | 313.6 | DIHP | 426.13 | BBP | 358.00 | DIHP | 465.77 |
| DOP | 462.95 | DDB (Diluent) | 41.70 | DIHP | 213.07 | DDB (Diluent) | 75.06 | DIHP | 232.89 | DOA | 130.06 |
| Thiotin stabilizer | 3.97 | Dispersion of azodicarbonamide stabilized in DOP (25% solids) | 100.00 | DDB (Diluent) | 100.08 | Neutralized anionic phosphoric ester | 22.32 | DDB (Diluent) | 16.68 | DDB | 104.25 |
| Neutralized anionic phosphoric ester | 11.16 | Emulsion PVC with a K value of 70 | 475.00 | Epoxy resin | 46.00 | Thiotin stabilizer | 8.40 | Dispersion of azodicarbonamide and kicker (2/1) with 50% solids in DOP | 126.00 | Thiotin stabilizer | 4.96 |
| Microsuspension PVC with a K value of 80 | 500.00 | Microsuspension PVC with a K value of 70 | 475.00 | Thiotin stabilizer | 34.72 | Microsuspension PVC with a K value of 80 | 500.00 | Emulsion PVC with a K value of 67 | 750.00 | Emulsion PVC with a K value of 70 | 600.00 |
| Microsuspension PVC with a K value of 75 | 250.00 | Suspension PVC with a K value of 66 | 300.00 | Silicone-containing anti-foaming agent | 2.26 | Microsuspension PVC with a K value of 75 | 300.00 | Microsuspension PVC with a K value of 70 | 150.00 | Suspension PVC with a K value of 66 | 400.00 |
| Titanium dioxide | 25.00 | Titanium dioxide | 50.00 | UV stabilizer | 2.55 | Suspension PVC with a K value of 66 | 200.00 | Calcium carbonate (14 µm) | 550.00 | Titanium dioxide | 25.00 |
| Calcium carbonate (14 µm) | 700.00 | Calcium carbonate | 250.00 | Microsuspension PVC with a K value of 82 | 500.00 | Coated calcium carbonate (24 µm) | 150.00 | | | Calcium carbonate (14 µm) | 300.00 |
| Stearin-coated calcium carbonate (24 µm) | 200.00 | | | 4% vinyl acetate/vinyl chloride copolymer with a K value of 72 | 125.00 | Calcium carbonate | 550.00 | | | Silicone-containing foaming agent | 40.00 |
| | | | | Suspension PVC with a K value of 66 | 325.00 | | | | | | |
| | 2259.78 | | 2263.00 | | 1962.28 | | 2231.91 | | 2183.57 | | 2070.04 |
| Viscosity = 6000 ± 500 m Pa.s | | Viscosity = 4500 ± 500 m Pa.s | | Viscosity = 850 ± 250 m Pa.s | | Viscosity = 2500 ± 500 m Pa.s | | Viscosity = 4500 ± 500 m Pa.s | | Viscosity = 900 ± 100 m Pa.s Density = 580 g/l | |

All parts are given by weight
DOP: Di-2-ethylhexyl phthalate
DDB: Dodecylbenzene
BBP: Butylbenzyl phthalate
DIHP Diisoheptyl phthalate
DOA: Di-2-ethylhexyl adipate

EXAMPLE 1

The glass web is impregnated with an impregnation plastisol, of composition A, which is gelled conventionally, i.e. without having recourse to the catalytic burner according to the invention. Next, a pregelled decorative foam plastisol, of composition B, is deposited by means of a coating roll in an amount of 255 g/m². This decorative layer is then printed. Next, the surface is coated in an amount of 230 g/m² with a surface plastisol of composition C. The assembly is preheated on the drum 14 to 165° C. and then expanded and gelled in the oven 9. The temperature at which the air 7 is injected is 190±5° C. The temperature reached by the transporting means 8 is 175±5° C. in the inlet region of the oven 9 and 215±5° C. in the outlet region. The run speed of the textile web 2 coated with the plastisol 6 is 10 m/min. The thickness of the plastisol layer 6 is $^{91}/_{100}$ mm before expansion and $^{121}/_{100}$ mm after expansion. The volatile organic fraction content at the outlet 7b of the gelling oven 9 is 1.2 g/Nm³.

The yellowness index, measured along the blue-yellow axis (−1 for blue and +1 for yellow) in the CIE L, a, b standardized reference system, by means of a spectrocolorimeter, is 0.2 points compared to 0.7 points in a conventional gelling oven. The elongation of the floor covering is 80%, compared to 40% when it is gelled in a conventional oven.

EXAMPLE 2

This example starts with the intermediate product obtained according to Example 1.

Next, a smoothing plastisol, according to a composition D, is applied on the reverse side of the glass web in an amount of 300 g/m². The assembly is then gelled in the oven 9.

The temperature of the injected air 7 is 170±5° C. The temperature of the transporting means 8 is 150±5° C. in the inlet region and 160±5° C. in the outlet region. The run speed of the means 8 is 20 m/min. The thickness of the reverse-side layer deposited is 1.3 mm.

The gelled reverse-side layer has a beautiful appearance and is very uniform with good mechanical properties. The yellowness index measured as previously is less than 0.2 points.

EXAMPLE 3

This example starts from the intermediate product obtained according to Example 1.

A comfort foam plastisol, according to composition E, is then applied using a doctor in an amount of 395 g/m².

The temperature of the inlet air 7 is 195±5° C. The temperature of the transporting means 8 is 174±4° C. in the inlet region and 203±3° C. in the outlet region. The run speed of the means 8 is 8 m/min. The thickness of the foam plastisol deposited is 1.33 mm after gelling. The deviation, with respect to this average thickness, does not exceed 0.1 mm in the machine and cross directions. The yellowness index measured as previously is less than 0.2 points.

The elongation values measured on the floor covering are 70±10% compared to 35±10% when the foam plastisol is expanded in a conventional gelling oven.

EXAMPLE 4

This example starts from the intermediate product obtained according to Example 1.

A mechanically foamed plastisol, having the composition F, is applied using a doctor in an amount of 870 g/m². The expression "mechanical foam" means any foam obtained by mechanical means, for example by agitation, i.e. without the addition of chemical foaming agents. The assembly is then gelled in the oven 9, the incoming air 7 having a temperature of 190±5° C. The temperature of the means 8 is 175±5° C. in the inlet region and 195±5° C. in the outlet region. The run speed of the means 8 is 6.5 m/min. The thickness of the plastic deposited is 1.5 mm. The deviation with respect to this average thickness does not exceed 0.08 mm in the machine and cross directions.

What is claimed is:

1. A process for manufacturing a flat composite plastic structure, said plastic structure comprising a textile web made of yarns or fibers and at least one layer of a thermoplastic impregnating said textile web on one of its sides, said process comprising:

coating the textile web with at least one layer of a plastisol, said plastisol comprising said thermoplastic dispersed in a volatile organic fraction comprising a plasticizing agent, so as to obtain on said textile web said layer in the liquid or pasty state; and transporting said textile web coated with said at least one layer of plastisol through an oven for gelling the plastisol, said oven comprising an infra-red gas burner radiating heat towards said at least one layer of plastisol, so as to remove said volatile organic fraction of the at least one coated layer and to cause the plastisol to gel;

wherein the improvement comprising controlling the gelling conditions of the plastisol by (i) selecting a catalytic burner as the infra-red gas burner, said catalytic burner comprising a refractory porous structure supporting a combustion catalyst and having a radiant surface, and (ii) flowing a stream of preheated air as a co-current over said textile web coated with said at least one layer of plastisol, so as to ensure contact of the preheated air with said at least one layer of plastisol and said radiant surface of said catalytic burner.

2. A process as claimed in claim 1, wherein the catalytic burner is a primary-air burner in which a combustible gas and primary air are mixed before combustion in contact with the catalyst.

3. A process as claimed in claim 1, wherein the catalytic burner is a secondary-air burner in which the combustible gas passes through the refractory porous structure, without the addition of primary air.

4. A process as claimed in claim 1, wherein the controlling comprises reducing deplasticization of said at least one layer of plastisol relative to non-catalytic infrared burners.

5. A process for manufacturing a flat composite plastic structure, said plastic structure comprising a textile web made of yarns or fibers and at least one layer of a thermoplastic impregnating said textile web on one of its sides, said process comprising:

coating the textile web with at least one layer of a plastisol, said plastisol comprising said thermoplastic dispersed in a volatile organic fraction comprising a plasticizing agent, so as to obtain on said textile web said layer in the liquid or pasty state;

transporting said textile web coated with said at least one layer of plastisol through an oven for gelling the plastisol, said oven comprising a catalytic burner radiating heat towards said at least one layer of plastisol, so as to remove said volatile organic fraction of the coated layer and to cause the plastisol to gel, said catalytic burner comprising a refractory porous structure supporting a combustion catalyst and having a radiant surface; and controlling the gelling conditions of the plastisol by (i) said catalytic burner radiating heat towards said at least one layer of plastisol, and (ii) flowing a stream of preheated air as a co-current over said textile web coated with said at least one layer of plastisol, so as to ensure contact of the preheated air with said at least one layer of the plastisol and said radiant surface of said catalytic burner.

6. A process as claimed in claim 5, wherein the catalytic burner is a primary-air burner in which a combustible gas and primary air are mixed before combustion in contact with the catalyst.

7. A process as claimed in claim 5, wherein the catalytic burner is a secondary-air burner in which the combustible gas passes through the refractory porous structure, without the addition of primary air.

8. A process as claimed in claim 5, wherein the controlling comprises reducing deplasticization of said at least one layer of plastisol relative to non-catalytic infrared burners.

* * * * *